Figure 1:
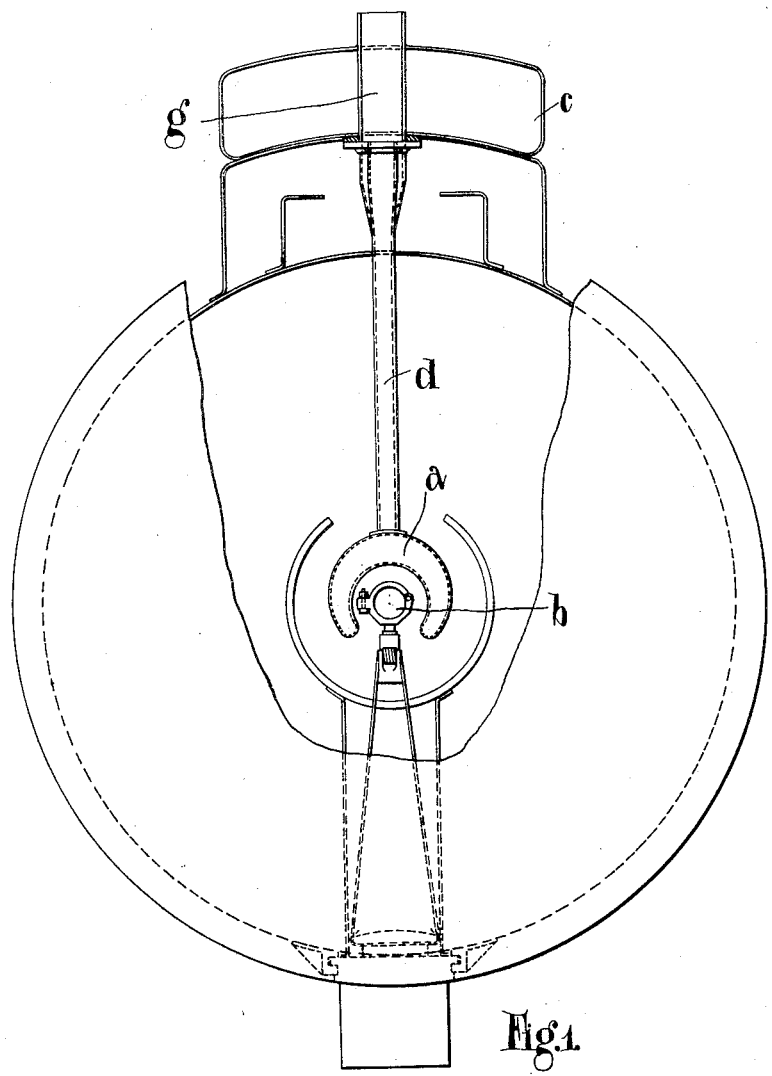

Jan. 29, 1924.  
C. A. PARSONS ET AL  
1,482,142  
SEARCHLIGHT AND OTHER PROJECTOR  
Filed May 10, 1920  2 Sheets-Sheet 1

Inventors:  
Charles A. Parsons,  
Ebenezer Bennett,  
Harry Rowe.

By Spear, Middleton, Donaldson & Hall ATTORNEY

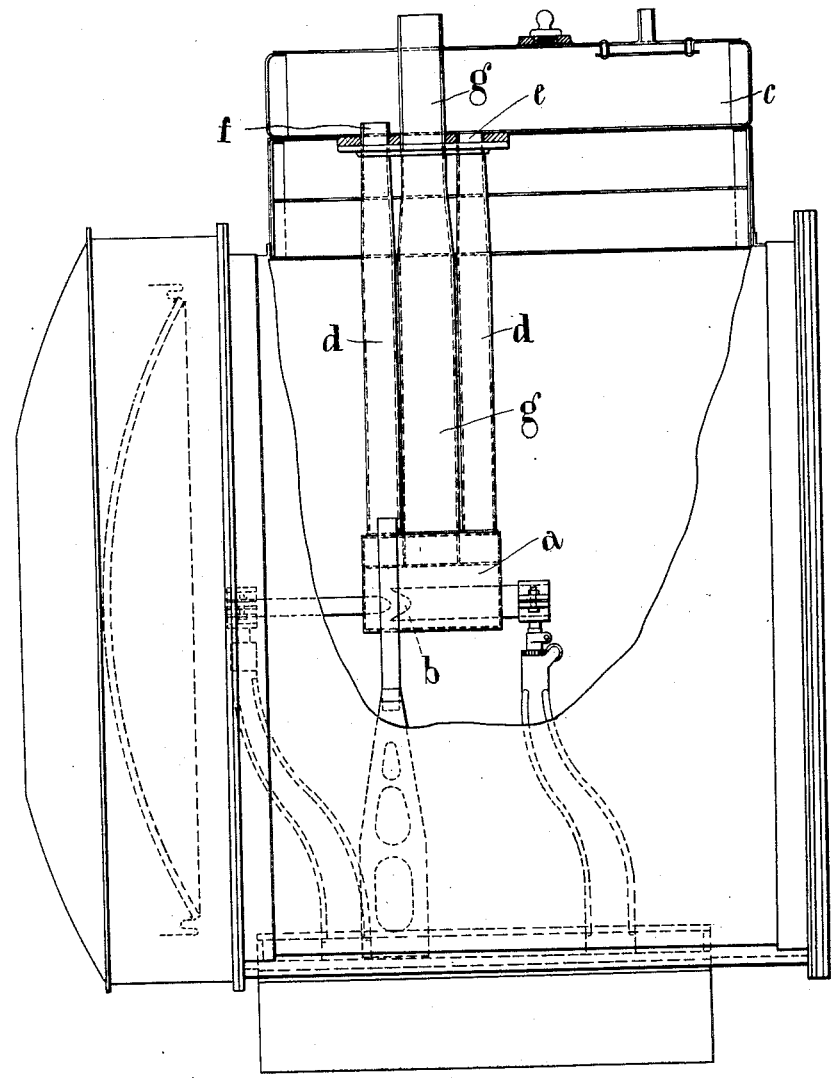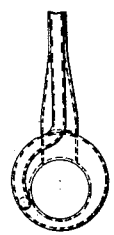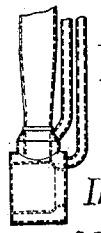

Patented Jan. 29, 1924.

1,482,142

UNITED STATES PATENT OFFICE.

CHARLES ALGERNON PARSONS, EBENEZER BENNETT, AND HARRY ROWE, OF NEW-CASTLE-UPON-TYNE, ENGLAND; SAID BENNETT AND ROWE ASSIGNORS TO SAID PARSONS.

SEARCHLIGHT AND OTHER PROJECTOR.

Application filed May 10, 1920. Serial No. 380,372.

*To all whom it may concern:*

Be it known that we, CHARLES ALGERNON PARSONS, K. C. B., EBENEZER BENNETT, and HARRY ROWE, all subjects of the King of Great Britain and Ireland, and residing at Heaton Works, Newcastle-upon-Tyne, in the county of Northumberland, England, have invented certain new and useful Improvements in Searchlight and Other Projectors, of which the following is a specification.

This invention relates to searchlight and other projectors and has for its object to provide means for keeping the temperature of the mirror and other parts at a moderate temperature so that increased intensity in the power of the light can be obtained without damage to the apparatus, with the result that larger currents can be employed producing more powerful beams of light.

Searchlight reflectors are usually constructed of glass, silvered on the back surface, the silver being protected by copper plating reinforced either by sheet lead, varnish or other means, and in some cases reflectors are made of metal plated with silver, gold, palladium or other high reflecting surface.

The factor limiting the intensity of the power of light in such projecting apparatus is primarily the temperature which the mirror can stand.

The heating of the mirror in a projector arises partly from radiant heat and partly from general heat generated by the flame of the arc and the combustion of the carbon carried by convection and conduction, and the temperature of the mirror is also affected by the general rise of temperature of the projector caused by radiant and conveyed or conducted heat.

The present invention consists broadly in providing means by which heat other than radiant heat can be drawn off and dissipated so that the temperature rise of the mirror is minimized.

The invention further consists in providing a water jacket surrounding, or nearly surrounding the arc, and also adapted to shield the body of the projector from radiant heat.

The invention further consists in providing in combination with a cooling jacket a chimney adapted to draw off the hot gases produced by the arc so that they do not mix with the air in the projector.

The invention further consists in constructing the water jacket in such a manner that it shields the body of the projector from the greater part of the radiant heat of the arc while allowing a cone of light sufficiently large to pass freely to the mirror.

The invention further consists in the improved means for limiting the temperature of mirrors in projectors of searchlights and the like hereinafter described.

Referring to the accompanying drawings;

Figure 1 is a front view and

Figure 2 a sectional elevation of an arc lamp constructed according to the invention, while Figures 3 and 4, 5 and 6, 7 and 8, 9 and 10 are detail views showing modifications of the cooling jacket.

In the form of the invention illustrated in Figures 1 and 2, we provide a water jacket $a$ preferably made of copper in the form of a saddle surrounding the arc $b$ as completely as possible. When the standard lamp is used a longitudinal opening below is left to allow passage for the positive carbon support. Suitably placed above the water jacket we provide a tank or reservoir $c$ containing water connected to the water jacket by pipes $d$ opening into the tank at different levels $e$ $f$ so that a circulation by the heating of the water takes place through the pipes, water jacket and tank.

In the upper portion of the water jacket we insert a chimney $g$ opening almost immediately above the arc and adapted to lead away the flame of the arc and the very hot gases produced by, and in the neighbourhood of the arc, thus preventing these gases from mixing with the air in the projector band and thereby reducing the temperature of the mirror. Natural circulation may be sufficient but it may be assisted by a fan of ordinary construction operable in the ordinary manner but not shown as it forms no part of this invention.

The jacket may be constructed in such a manner that it shields the body or barrel of the projector from the greater part of the radiant heat which would otherwise fall upon it from the arc, only leaving a cone of light sufficiently large to embrace the mirror and thus only allowing free passage for the radiant heat which cannot be avoided without diminishing the intensity of the light falling on the mirror. Thus the mirror is subjected to very little heating except that which arises from the radiant heat emanating from the crater of the arc.

Figure 3:
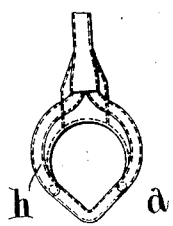
Figure 4:
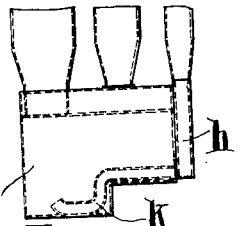

The jacket may only surround the upper part of the arc as above described or it may be constructed so as to completely surround the arc. In the latter case, however, the portion of the jacket which is immediately below the arc should be constructed of a V form, as shown in Figures 3 and 4, or such other form as will avoid the occurrence of a steam lock, as otherwise hot particles falling on the thin copper or other material of which the jacket is composed would melt the metal and destroy the jacket.

Figure 5:
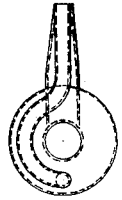
Figure 6:
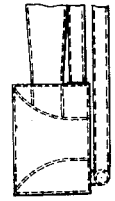

The water pipes leading to the jacket may be arranged in different manners, for example, in Figures 3 and 4, the cooling pipe $h$ may be arranged to open into a sump $k$ arranged at one end of the jacket $a$ and immediately below the arc, while the hot water outlet pipe $l$ is connected at the top of the jacket. Further, the aperture in the jacket may be of any desired form, for instance, the aperture may be of gradually increasing diameter from the front to the back, as shown at Figures 5 and 6, or other forms of aperture may be adopted, as shown in Figures 7 and 8, and 9 and 10, according to the type of lamp and the direction in which it is required to throw the beam of light. In fact, any suitable arrangement of jacketing and piping may be employed to suit special circumstances.

Having now described our invention, what we claim as new and desire to secure by Letters Patent is:—

1. A lamp including a barrel, an arc within the barrel as the source of light, a water jacket for the arc and adapted to intercept the radiant heat from the arc, a reservoir supplying a cooling fluid to said water jacket, and circulation system including an inlet pipe and an outlet pipe extending into the reservoir, the reservoir end of the inlet pipe being at a lower level than that of the outlet pipe connecting said water jacket and reservoir.

2. A lamp including a barrel, an arc within the barrel as the source of light, a water jacket for the arc adapted to intercept the radiant heat from the arc, and a chimney extending through the water jacket to within proximity of the arc and extending to the exterior of the barrel to receive the heated gases from the arc as soon as formed.

3. The device of claim 1, said circulation pipes entering the reservoir to one side of the lateral center thereof.

In testimony whereof we have signed our names to this specification.

CHARLES ALGERNON PARSONS.
EBENEZER BENNETT.
HARRY ROWE.